Patented Sept. 19, 1933

1,927,129

UNITED STATES PATENT OFFICE 1,927,129

HYDROGENATION OF HOMOLOGUES OF ANILINE

Wilhelm Lommel, Wiesdorf-on-the-Rhine, and Theodor Goost, Leverkusen - on - the - Rhine, Germany, assignors to General Aniline Works, Inc., New York, N. Y., a corporation of Delaware No Drawing. Application April 26, 1928, Serial No. 273,148, and in Germany May 7, 1927

6 Claims. (Cl. 260—130.5)

The present invention relates to the hydrogenation of homologues of aniline.

In accordance with the invention homologues of aniline can be hydrogenated in a technical scale and with a satisfactory yield by reacting with hydrogen upon such bases at elevated temperature and at superatmospheric pressure in the presence of a hydrogenating catalyst, such as nickel, cobalt, iron, copper, platinum, palladium, (compare Sabatier, Die Katalyse, translated by Finkelstein, 1927, page 144), and suitable oxides and salts of these metals as for instance cobalt- or nickel oxide, cobalt formate, nickel oxalate etc. It is to be understood that by the term "homologues of aniline" we mean the proper homologues of aniline, such as the toluidines, the xylidines etc.

We prefer to use as catalyst a metal having an atomic weight of about 59 or its oxide, i. e. cobalt, nickel and their oxides, and to work at temperatures between 170–350° C. and at a pressure of more than 45 atmospheres especially between 50–200 atmospheres. The time during which hydrogenation takes place varies within very wide limits depending mainly upon the kind of the catalyst, the temperature, the pressure and the quantity of hydrogen to be combined with the starting material.

The following examples illustrate our invention without limiting it thereto:

*Example 1.*—100 parts by weight of para- or ortho-toluidine are heated in an autoclave provided with a stirrer with 2 parts by weight of a cobalt catalyst under a hydrogen pressure of about 100 atmospheres. The absorption of hydrogen becomes rapid at 270° C. and within two hours more than 60% of the toluidine used is hydrogenated.

*Example 2.*—100 parts by weight of meta toluidine are mixed with heating with 2 parts by weight of a cobalt catalyst under a hydrogen pressure of about 100 atmospheres. The absorption of hydrogen becomes very rapid at about 270°–280° C. 80% of hexa-hydro-meta-toluidine are produced at the end of 1½ hours. The catalyst may be used again.

*Example 3.*—100 parts by weight of para xylidine are heated in an autoclave provided with a stirrer with 2 parts by weight of nickel oxide under a hydrogen pressure of about 100 atmospheres. The absorption of hydrogen begins at about 275° C. About 30% of the charge is hydrogenated at the end of 1½ hours. Before working up the reaction product, the hydrogenated part can be removed and the unchanged part can be further hydrated with the same catalyst. The process can be accelerated by raising the temperature.

We claim:

1. Process, which comprises hydrogenating a homologue of aniline by means of hydrogen in the presence of a hydrogenating catalyst at a pressure higher than 45 atmospheres and at a temperature between 170 and 350° C.

2. Process, which comprises hydrogenating a homologue of aniline by means of hydrogen in the presence of a hydrogenating catalyst at a pressure between 50 and 200 atmospheres and at a temperature between 170 and 350° C.

3. Process, which comprises hydrogenating a homologue of aniline by means of hydrogen in the presence of a catalyst of the group consisting of the metals having an atomic weight of about 59 and their oxides at a pressure higher than 45 atmospheres and at a temperature between 170 and 350° C.

4. Process, which comprises hydrogenating a homologue of aniline by means of hydrogen in the presence of a catalyst of the group consisting of the metals having an atomic weight of about 59 and their oxides at a pressure between 50 and 200 atmospheres and at a temperature between 170 and 350° C.

5. Process which comprises hydrogenating a toluidine by means of hydrogen in the presence of a cobalt catalyst at a pressure of about 100 atmospheres and at a temperature between 270 and 280° C.

6. Process which comprises hydrogenating paraxylidine by means of hydrogen in the presence of a cobalt catalyst at a pressure of about 100 atmospheres and at a temperature of about 275° C.

WILHELM LOMMEL.
THEODOR GOOST